US012654358B2

(12) United States Patent
Tourne

(10) Patent No.: US 12,654,358 B2
(45) Date of Patent: Jun. 16, 2026

(54) METHODS AND SYSTEMS FOR CUTTING A CHANNEL IN A PRECAST CONCRETE SLAB

(71) Applicant: Concore BV, Helmond (NL)

(72) Inventor: J.A.A.M. Tourne, Helmond (NL)

(73) Assignee: Concore BV, Helmond (NL)

( * ) Notice: Subject to any disclaimer, the term of this patent is extended or adjusted under 35 U.S.C. 154(b) by 134 days.

(21) Appl. No.: 18/628,428

(22) Filed: Apr. 5, 2024

(65) Prior Publication Data

US 2024/0335979 A1 Oct. 10, 2024

Related U.S. Application Data

(60) Provisional application No. 63/494,402, filed on Apr. 5, 2023.

(51) Int. Cl.
*B28B 11/12* (2006.01)

(52) U.S. Cl.
CPC .................................... *B28B 11/12* (2013.01)

(58) Field of Classification Search
CPC ..... B28B 11/12; B28B 11/0863; B28D 1/043; B28D 1/045; B28D 1/048; B26D 3/06; B26D 3/08; E01C 23/0933
See application file for complete search history.

(56) References Cited

U.S. PATENT DOCUMENTS

| | | | | |
|---|---|---|---|---|
| 3,217,375 A * | 11/1965 | Kinnard | E04G 21/145 425/219 |
| 4,798,118 A * | 1/1989 | Carithers, Jr. | B26F 1/3853 83/564 |
| 5,529,735 A * | 6/1996 | Durham | B28B 11/14 264/157 |
| 5,921,228 A * | 7/1999 | Watson | B28D 1/043 125/38 |

(Continued)

FOREIGN PATENT DOCUMENTS

| | | |
|---|---|---|
| CN | 114311254 A | 4/2022 |
| EP | 1134061 B1 | 4/2004 |
| GB | 983964 A | 2/1965 |

(Continued)

OTHER PUBLICATIONS

European Patent Office Acting as The International Searching Authority, International Search Report and Written Opinion regarding PCT Application No. PCT/IB2024/053383, dated Aug. 26, 2024.

*Primary Examiner* — Carib A Oquendo
(74) *Attorney, Agent, or Firm* — DUNLAP CODDING, P.C.

(57) ABSTRACT

Systems and methods for forming a channel in an uncured concrete slab are described. The system includes a first blade, a second blade, and a third blade. The first and second blades are oriented vertically relative to the concrete slab and spaced a predetermined distance apart. The third blade (Continued)

is positioned between the first blade and the second blade to form a concrete-receiving interior. The system also includes a conveyer having fin(s) extending therefrom to move material through a chute. The first, second, and third blades are configured to cut the channel in the concrete slab and direct excess concrete into the chute where the conveyer moves the excess concrete out of and away from the channel.

20 Claims, 5 Drawing Sheets

(56) References Cited

U.S. PATENT DOCUMENTS

| | | | | |
|---|---|---|---|---|
| 9,315,955 | B2 * | 4/2016 | Knapp | E01C 23/094 |
| 2015/0298350 | A1 * | 10/2015 | Kankkunen | B26F 3/004<br>451/40 |

FOREIGN PATENT DOCUMENTS

| | | | |
|---|---|---|---|
| GB | 1215344 | A | 12/1970 |
| GB | 2281050 | A | 2/1995 |

* cited by examiner

METHODS AND SYSTEMS FOR CUTTING A CHANNEL IN A PRECAST CONCRETE SLAB

CROSS-REFERENCE TO RELATED APPLICATIONS

The present patent application claims priority to the provisional patent application identified by U.S. Ser. No. 63/494,402, filed on Apr. 5, 2023, the entire contents of which is hereby incorporated herein by reference.

BACKGROUND

Hollow core precast concrete elements are well understood building blocks that may be used for flooring and sometimes wall panels in commercial buildings or houses. The advantage of hollow core precast concrete elements is that compared to other precast elements no support structure is required. This results in a faster building cycle with a direct finish on top and bottom of the precast concrete elements.

When using hollow core precast concrete elements, infrastructure such as electrical tubing, water piping, gas piping, air ducting, etc., may be run in furred out spaces, which add cost and complexity to a structure, or in channels cut or formed directly in the precast concrete elements.

Various methods have been developed and used to cut or form the channel directly in the precast concrete elements. For instance, a router and suction method has been used where a vertical router is used to cut the channel in a formed and cured precast concrete element while suction removes the cut material. In another method, the two sides of the channel are cut in the cured pre-cast concrete element using a concrete cutting saw and the material in between is broken out. This method is relatively easy to apply, high speed, creates relatively clean edges of the channel due to the cutting blades. However, these methods are time consuming, costly, and/or messy.

In another method, a square or rectangular form may be added to the bottom of the compaction plate or finishing pan in a slipform machine, but this only allows a channel to be formed along a length of a concrete element as it is formed.

Therefore, a need exists for systems and processes for overcoming the problems associated with forming infrastructure channels in precast concrete elements. It is to such an improved system and method that the presently disclosed inventive concepts are directed.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
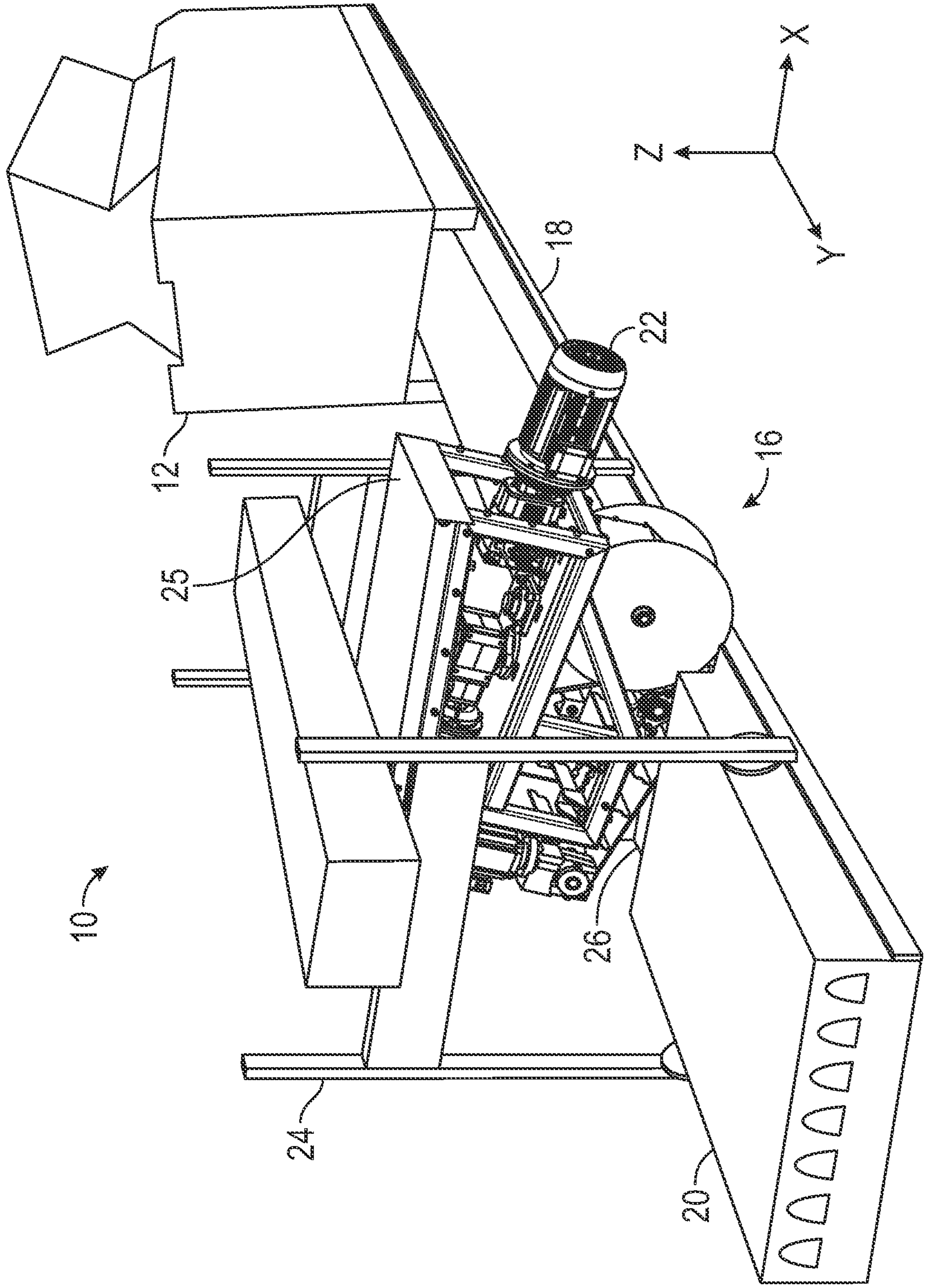
FIG. 1 is a perspective view of a system for forming precast concrete slabs for use in construction having a slipform machine and a channel cutting system in accordance with one implementation of the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other implementations or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one implementation," "an implementation," "some implementations," "one example," "for example," or "an example" means that a particular element, feature, structure or characteristic described in connection with the implementation is included in at least one implementation. The appearance of the phrase "in some embodiments," "in some implementations," or "one example" in various places in the specification is not necessarily all referring to the same embodiment, implementation, or example, for example.

Referring now to the drawings, and in particular FIGS. 1-7, shown therein is a system 10 for forming precast concrete slabs for use in construction. The system 10 is provided with a concrete forming machine 12 and a channel cutting system 16 that operate on rail system 18 to form a concrete slab 20 which may be a hollow core concrete slab. In some implementations, the concrete forming machine 12 may be an extruder or a slip forming machine.

The channel cutting system 16 is provided with a cutting unit 22 attached to a frame 24. The frame 24 provides a support and transport system for the cutting unit 22 and allows the cutting unit 22 to maneuver into a desired position to cut a channel 26 in the uncured concrete slab 20. The frame 24 may be provided with a drive system 25 that rotates the cutting unit 22. For example, the drive system 25 may rotated the cutting unit 22 around a Z axis and moves the cutting unit 22 on a plane formed by an X and a Y axis. For instance, when it is desired to cut the channel 26 transversely across the concrete slab 20 as illustrated in FIG. 1, the drive system 25 may be configured to rotate the cutting unit 22 around the Z axis until the cutting unit 22 is perpendicular to the concrete slab 20, i.e., along the X axis shown in FIG. 1. The drive system 25 may then move the cutting unit 22 up or down along the Z axis to a desired height (setting a depth of the channel 26 as will be described further herein) then advance the cutting unit 22 across the uncured concrete slab 20 cutting the channel 26.

In some implementations, the drive system 25 may be configured to rotate the cutting unit 22 to other angles in relation to the X axis, the Y axis, and/or the Z axis.

Figure 7:
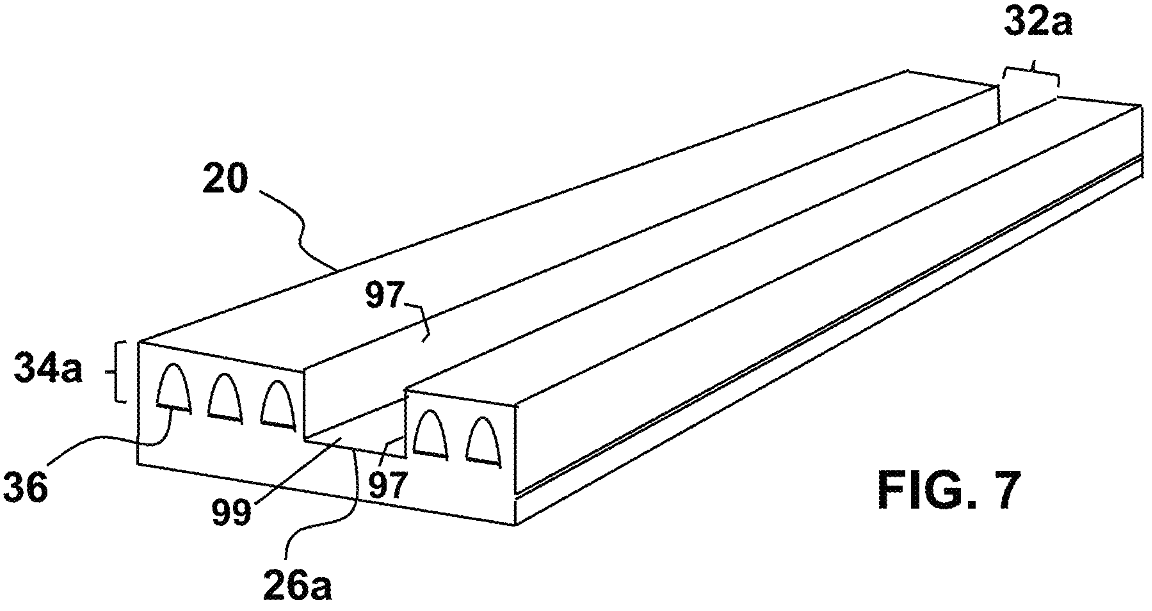
FIG. 7. is a perspective view of a hollow core concrete slab with a longitudinal channel cut using the channel cutting system of FIG. 1 in accordance with one embodiment of the present invention.

When cutting a channel lengthwise in a concrete slab (such as channel 26*a* as shown in FIG. 7), the frame 24 may be provided with a drive means (not shown) for propelling the frame 24 using the rail system 18. In such an embodiment, the drive system 25 may rotate the cutting unit 22 around the Z axis until the cutting unit is parallel with the Y axis. The drive system 25 may then move the cutting unit 22 up or down along the Z axis to set the depth of the channel 26*a*. The drive means of the frame 24 may then advance the cutting unit 22 to cut the channel 26*a*.

Figure 5:
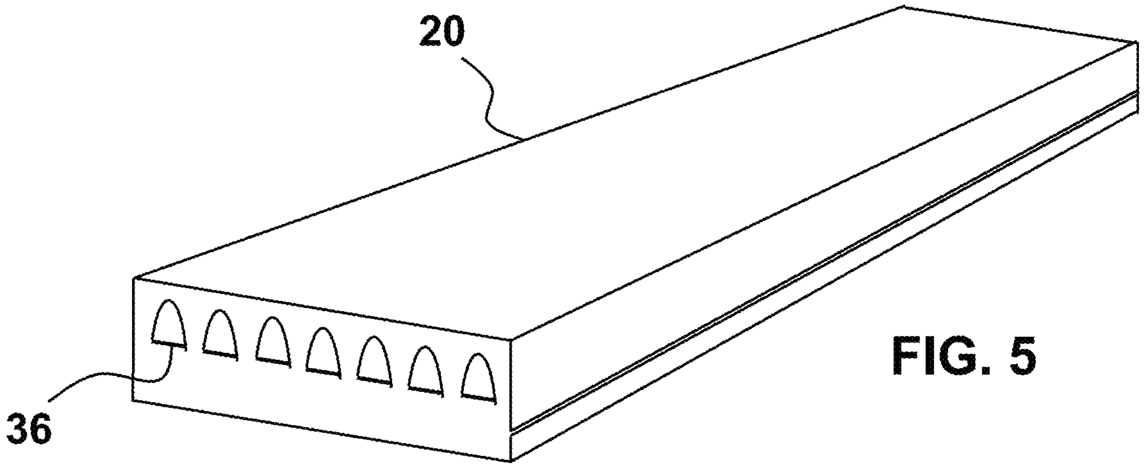
FIG. 5 is a perspective view of a hollow core concrete slab constructed in accordance with implementations of the present invention.
Figure 6:
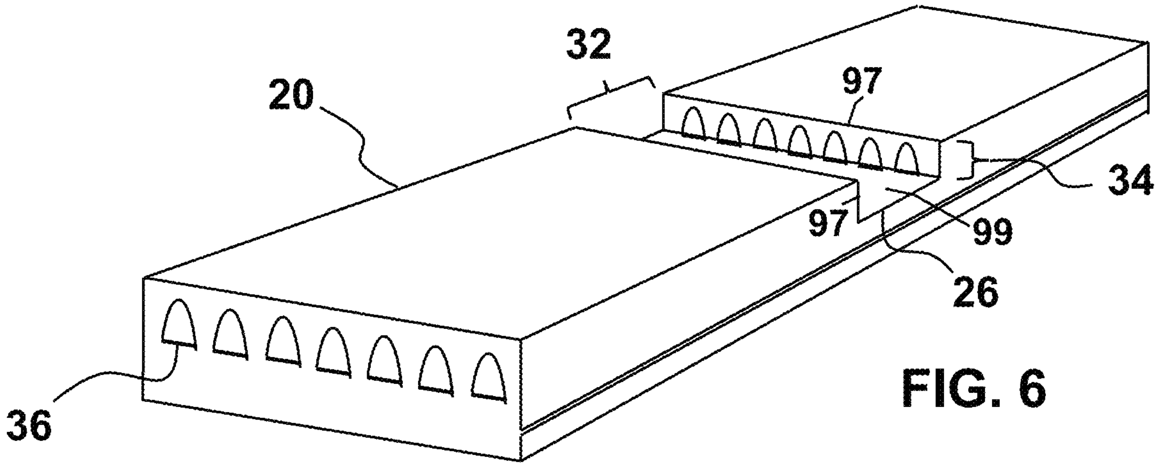
FIG. 6 is a perspective view of a hollow core concrete slab with a transverse channel cut using the channel cutting system of FIG. 1 in accordance with one implementation of the present invention.

As shown in FIGS. 5-7, the channel 26 may have a width 32, a depth 34, and a placement within the concrete slab. In some implementations, the width 32, the depth 34, and/or the placement of the channel 26 in the uncured concrete slab 20 may depend on the design of the concrete slab 20 (e.g., shape and size of hollow cores 36 (only one of which is labeled in the Figures), required load properties, etc.), and/or may depend on what will be placed in the channel 26 (e.g., electrical tubing, water piping, gas piping, air ducting, etc.). For instance, in some implementations, the depth 34 of the channel 26 may be only as deep as a lowest portion of the hollow cores 36 (see FIGS. 6 and 7).

The cutting unit 22 of the channel cutting system 16 is provided with at least one blade for forming the channel 26. In the implementation shown in FIGS. 1-4, for example, the channel cutting system 16 includes a first vertically oriented blade 50, a second vertically oriented blade 52 spaced laterally from the first vertically oriented blade 50, and a horizontal blade 54 (which may be referred to as a third blade 54) between the first vertically oriented blade 50 and the second vertically oriented blade 52. The first vertically oriented blade 50, the second vertically oriented blade 52, and the horizontal blade 54 cooperate to form a concrete-receiving interior 55.

Though the blades are discussed herein as "vertical" and "horizontal" for ease of description and relative to a horizontally positioned uncured concrete slab 20, it will be understood that the blades may be orientated at other angles.

The channel cutting system 16 may further comprise a chute 57 positioned proximate to the concrete-receiving interior 55, the chute 57 positioned so as to receive concrete cuttings from the channel 26 being cut in the concrete slab 20 out of the concrete-receiving interior 55.

The channel cutting system 16 may further comprise a conveyer 58 which is configured to direct the concrete cuttings in the chute 57 out and away from the channel 26 being cut in the concrete slab 20. The conveyer 58 may have a plurality of fins 60 (not all of which are labeled for clarity).

The horizontal blade 54 may have an upper side 61 and an outer side 67.

The horizontal blade 54 may be provided with one or more scrapers 56 (only one of which is labeled) on the upper side 61 of the horizontal blade 54. The one or more scrapers 56 may direct or move excess concrete material (concrete cuttings) into the chute 57 where the conveyer 58 having the plurality of fins 60 moves the concrete cuttings out and away from the channel 26 being cut in the uncured concrete slab 20.

In some implementations, the channel cutting system 16 may include a wobble dado blade including a single blade mounted on a multi-piece hub that can be adjusted to vary the angle at which the blade is oriented to an arbor shaft.

The angle at which the blade is oriented regulates the width of the data cut for forming the channel 26.

Figure 2:
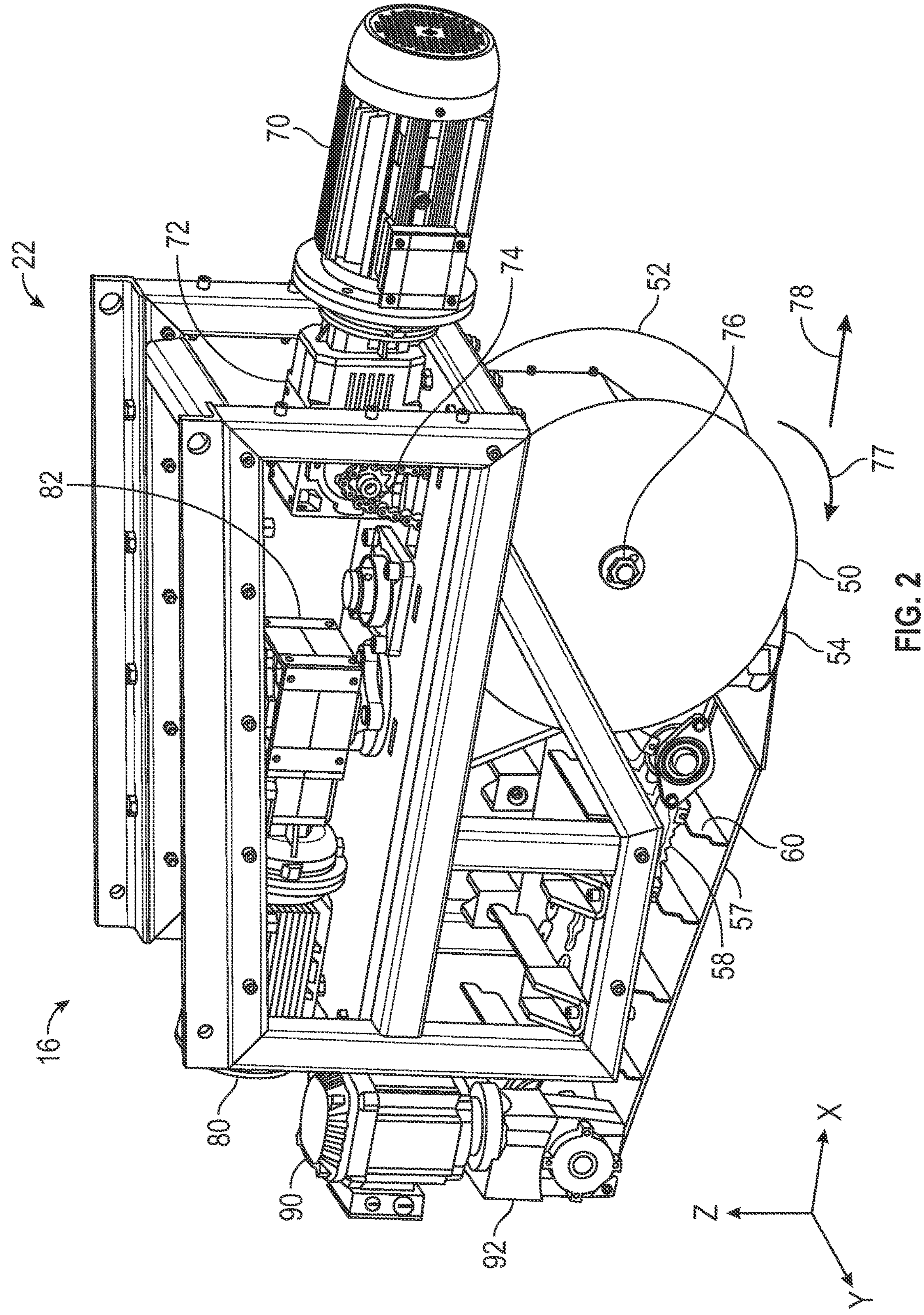
FIG. 2 is a side perspective view of a cutting unit of the channel cutting system of FIG. 1 in accordance with one implementation of the present disclosure.

As shown in FIG. 2, in some implementations, the first and second vertically oriented blades 50 and 52 may be driven by a first motor 70 operably connected to a first transmission 72 which transfers power from the first motor 70 to a drive member 74. In some implementations, the drive member 74 may be a chain 74. The drive member 74 may be other types of connects known in the art. The drive member 74 may be operably connected to an axle 76 connecting the first and second vertically oriented blades 50 and 52. Operation of the first motor 70 drives the first and second vertically oriented blades 50 and 52 to a desired speed. The first transmission 72 causes the first and second vertically oriented blades 50 and 52 to rotate in a desired direction (represented by arrow 77). The desired direction of rotation of the first and second vertically oriented blades 50 and 52 may be opposite a direction of travel (represented by arrow 78) of the cutting unit 22, for instance.

The first and second vertically oriented blades 50 and 52 may be fixed a predetermined distance apart depending on the desired width 32 of the channel 26. For example, a distance 79 measured from an outer face of the first vertically oriented blade 50 to an outer face of the second vertically oriented blade 52 would be equal to the width 32 of the channel 26.

Figure 3:
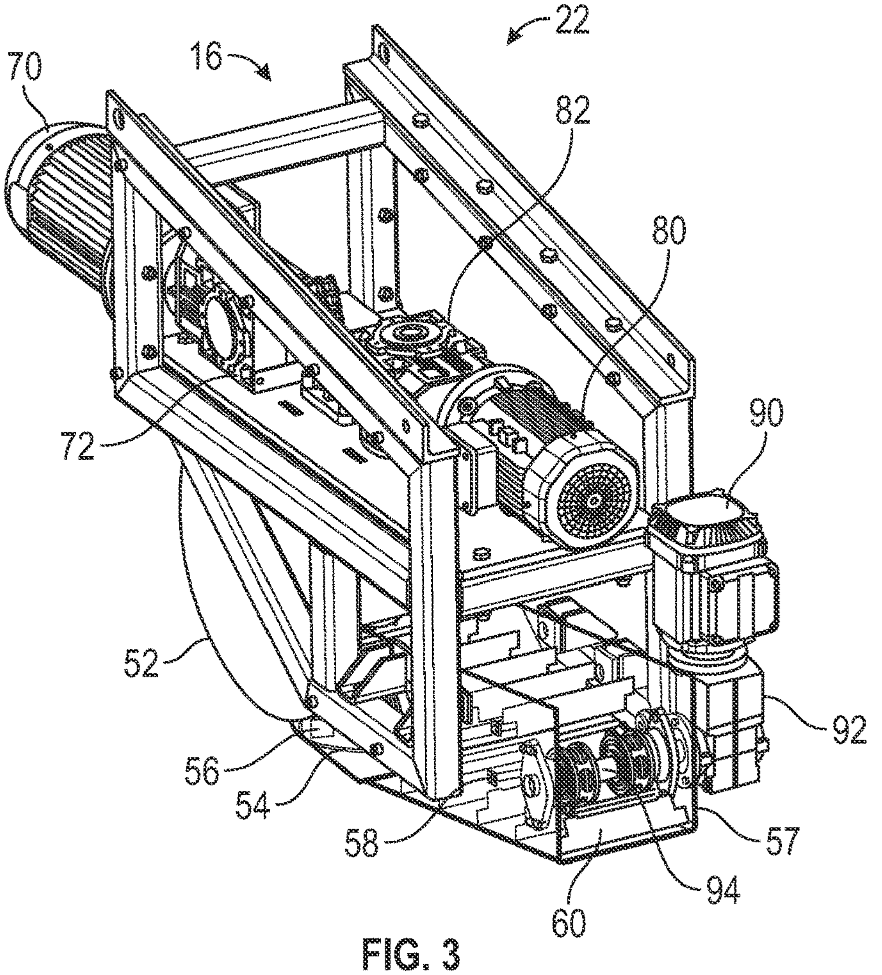
FIG. 3 is a rear perspective view of the cutting unit of FIG. 2 in accordance with one implementation of the present disclosure.
Figure 4:
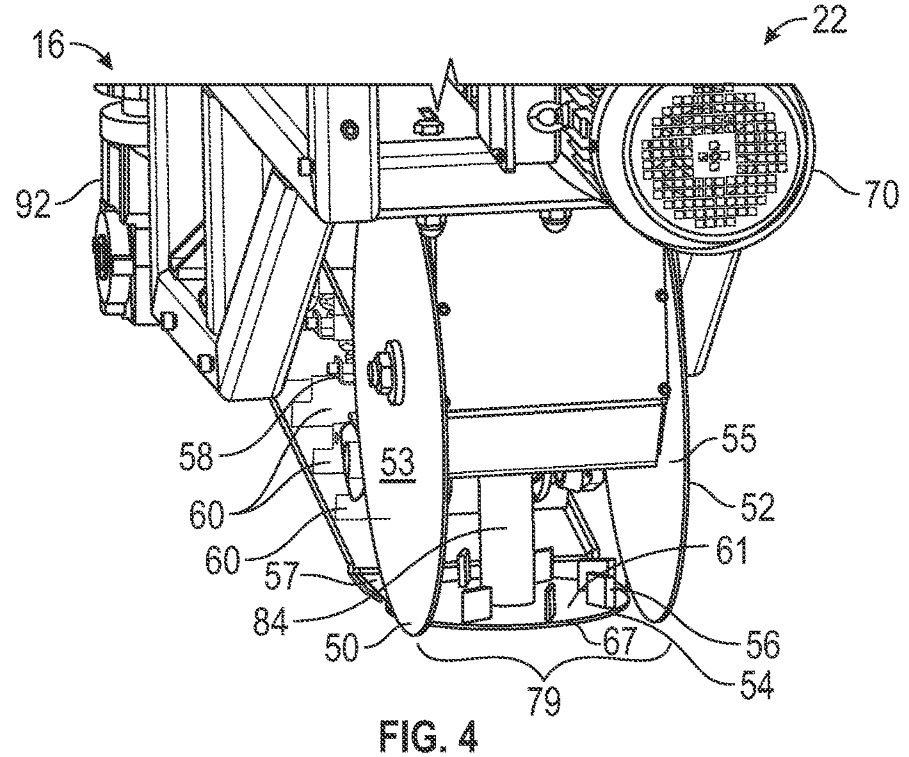
FIG. 4 is a front perspective view of vertically oriented and horizontally oriented cutting wheels of the cutting unit of FIG. 2 in accordance with one implementation of the present disclosure.

As shown in FIGS. 2-4, in some implementations, the horizontal blade 54 may be driven by a second motor 80 operably connected to a second transmission 82 which transfers power from the second motor 80 to a drive member such as driveline 84 which is operably connected to the horizontal blade 54. A direction of rotation of the horizontal blade 54 may be selected depending on a shape and orientation of the plurality of scrapers 56. For instance, in the setup illustrated in FIG. 4, the horizontal blade 54 would be driven in a clockwise rotation so that the plurality of scrapers 56 could direct or move excess concrete material (the concrete cuttings) removed by the first vertically oriented blade 50, the second vertically oriented blade 52, and the horizontal blade 54 cutting the channel 26, into the chute 57 where the fins 60 of the conveyer 58 can push the excess concrete material out and away from the channel 26 being cut.

In some implementations, the conveyer 58 may be driven by a third motor 90 connected to a third transmission 92 which transfers power from the third motor 90 to a second axle 94 which is operably connected to the conveyer 58. Rotation of the conveyer 58 causes the plurality of fins 60 to sweep the excess concrete material in the chute 57 out and away from the channel 26 being cut in the uncured concrete slab 20. In some implementations, the chute 57 may deliver the concrete material to a box (not shown) or other waste material catch system that may collect or carry away the excess concrete material removed from the channel 26 to be reused or disposed of. The chute 57 may be proximate to and/or connected to the waste material catch system.

The channel 26 is cut soon after the slipform machine 12 has formed or extruded the concrete slab 20 while the concrete is still fresh and has not had a chance to harden or cure. In other words, the channel 26 is preferably cut while the concrete is uncured but has sufficient viscosity to be compacted and maintain the compacted shape after compaction and until the concrete slab 20 is cured. The timeframe within which the channel 26 may be cut will vary depending on the chemical makeup of the concrete and the environmental conditions that exist when the concrete slab 20 is formed. By way of example and not limitation, in some instances it may be desirable to begin forming the channel 26 as soon as the channel cutting system 16 can be moved into place following the concrete forming machine 12.

The first and second vertically oriented blades 50 and 52 and the horizontal blade 54 are arranged and oriented to cleanly cut the channel 26 to a desired width and depth and remove the excess concrete material during the process. The first and second vertically oriented blades 50 and 52 form side walls 97 of the channel 26 and the horizontal blade 54 forms a bottom 99 of the channel 26. Excess concrete material, meaning concrete material that is between the first and second vertically oriented blades 50 and 52 and above the horizontal blade 54 as the channel 26 is being cut, is swept out of the channel 26 by the rotation of the scrapers 56 on the horizontal blade 54 and into the chute 57 where the fins 60 of the conveyer 58 push the excess concrete material (e.g., uncured concrete material) up and out of the chute 57 to be reused or disposed of.

As the channel 26 is being cut, outward facing surfaces 53 of the first and second vertically oriented blades 50 and 52 and the outer side 67 of the horizontal blade 54 may act as floats, smoothing the sidewalls and bottom of the channel 26 as well as acting as temporary forms that help the channel 26 form into and retain the desired shape. This means the cutting unit 22 leaves a relatively clean channel 26 that requires less material cleanup or finishing work after the cut is completed relative to other channel forming methods.

In the exemplary figures, the first motor 70, the second motor 80, and the third motor 90, are illustrated as electric motors. However, it should be noted that other types of motors such as hydraulic motors, for instance, may be used.

In some implementations, motors may directly drive elements such as the first and second vertically oriented blades 50 and 52, the horizontal blade 54, and the conveyer 58, thereby eliminating the need for elements such as the first transmission 72, the second transmission 82, the third transmission 92, the chain 74, driveline 84, and/or second axle 94.

In the exemplary implementations, excess concrete material is moved out of the channel 26 by the conveyer 58. In some implementations, the excessive concrete material may be moved out of the channel 26 using an auger, a vibration plate, a drag chain, or other similar systems.

In an exemplary method of use, the concrete forming machine 12 is used to form the concrete slab 20 followed by the cutting unit 22 cutting the channel 26 in the uncured concrete slab 20. The cutting unit 22 may cut the channel 26 immediately after the concrete forming machine forms the concrete slab 20. In some implementations, the orientation of the cutting unit 22 relative to the frame 24 is set to cut the channel 26 either transversely or lengthwise in the uncured concrete slab 20. When the cutting unit 22 is positioned relative to the frame 24 to cut the channel 26 in a transverse direction in the uncured concrete slab 20, the frame 24 may be translated on the rail system 18 to a desired location for the channel 26 to be cut in the uncured concrete slab 20. The cutting unit 22 is translated across the uncured concrete slab 20 (while the frame 24 is fixed) to form the channel 26 (in implementations containing motors, the first motor 70, the second motor 80 and the third motor 90 may be actuated).

When the cutting unit 22 is set to cut the channel 26 lengthwise relative to the concrete slab, the cutting unit 22 may be translated on the frame 24 to a desired lateral position in relation to the slab, and then the frame 24 moves the cutting unit 22 lengthwise along the uncured concrete slab 20 to form the channel 26 (as the first motor 70, the second motor 80 and the third motor 90 may be actuated, for implementations with motors).

As the first and second vertically oriented blades 50 and 52 and the horizontal blade 54 are rotated, the first and second vertically oriented blades 50 and 52 form the side walls 97 of the channel 26 and the horizontal blade 54 forms the bottom 99 of the channel 26. Excess concrete material, meaning concrete material that is between the first and second vertically oriented blades 50 and 52 and above the horizontal blade 54 as the channel 26 is being cut (which may be referred to as concrete cuttings), is swept out of the channel 26 by the rotation of the scrapers 56 on the horizontal blade 54 and into the chute 57 where the fins 60 of the conveyer 58 push the excess concrete material (e.g., uncured concrete material) up and out of the chute 57 to be reused or discarded.

Figure 8:
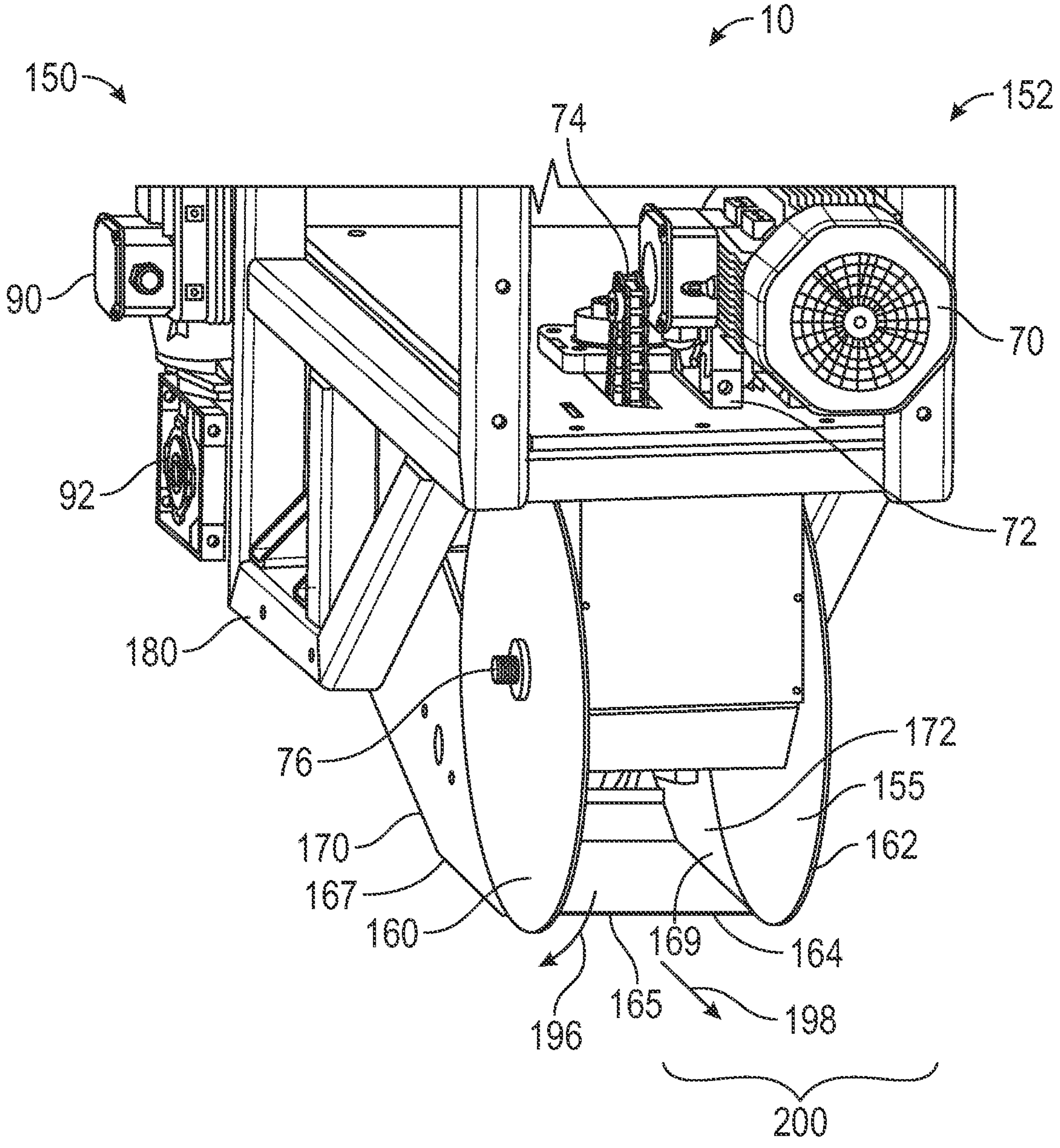
FIG. 8. is a front perspective view of a cutting unit having vertically oriented driven cutting blades and a horizontally oriented static cutting blade constructed in accordance with one implementation of the present disclosure.

Referring now to FIG. 8, shown therein is a front perspective view of a channel cutting system 150 having a cutting unit 152 that may be used with the system 10 described above and in the method of use as described above instead of the cutting unit 22. The channel cutting system 150 is similar to channel cutting system 16. Therefore, in the interest of brevity, the same reference numbers will be used to identify the same or similar elements.

The channel cutting system 150 may be provided with a first vertically oriented blade 160, a second vertically oriented blade 162, and a horizontally oriented static cutting blade 164 (which may be referred to as a third blade 164). The first vertically oriented blade 160, the second vertically oriented blade 162, and the horizontally oriented static cutting blade 164 cooperate to form a concrete-receiving interior 155.

The horizontally oriented static cutting blade 164 may have a front edge 165 configured to contact the uncured concrete slab 20 in cutting the channel 26, a first side edge 157 and a second side edge 159 separated by a width of the horizontally oriented static cutting blade 164. The horizontally oriented static cutting blade 164 may be statically positioned (that is, non-rotatably positioned) between the first vertically oriented blade 160 and the second vertically oriented blade 162.

In some implementations, similarly to those described regarding FIGS. 1-7, the first and second vertically oriented blades 160 and 162 may be driven by the first motor 70 operably connected to the first transmission 72 which transfers power from the first motor 70 to a drive member 74 (such as the chain 74). The drive member 74 may be operably connected to the axle 76 connecting the first and second vertically oriented blades 160 and 162. Operation of the first motor 70 drives the first and second vertically oriented blades 160 and 162 to a desired speed. The first transmission 72 causes the first and second vertically oriented blades 160 and 162 to rotate in a desired direction (represented by arrow 196) which may be opposite to a direction of travel (represented by arrow 198) of the cutting unit 152, for instance.

The first and second vertically oriented blades 160 and 162 may be arranged a predetermined distance apart depending on the desired width 32 of the channel 26. For example, a distance 200 measured from an outer face of the first vertically oriented blade 160 to an outer face of the second vertically oriented blade 162 would be equal to the width 32 of the channel 26.

The horizontally oriented static cutting blade 164 may be provided with or connected to a first side 170 and a second side 172. In some implementations, the first side 170 extends at an angle from the first side edge 167 of the horizontally oriented static cutting blade 164 and the second side 172 extends at an angle from the second side edge 169 of the horizontally oriented static cutting blade 164. In some implementations, the first side 170 and the second side 172 of the horizontally oriented static cutting blade 164 may be mechanically connected to a frame 180 of the cutting unit 152. In some implementations, the first side 170, and the second side 172 may cooperate with the horizontally oriented static cutting blade 164, the first vertically oriented blade 160, and the second vertically oriented blade 162 to form the concrete-receiving interior 155.

In some implementations, the horizontally oriented static cutting blade 164, the first side 170, and the second side 172 may be arranged to substantially align the horizontally oriented static cutting blade 164 with an outer circumference of the first and second vertically oriented blades 160 and 162. In such an implementation, a location of the horizontally oriented static cutting blade 164 sets the depth 34 of the channel 26. The horizontally oriented static cutting blade 164, the first side 170, and the second side 172 may be arranged to form a u-shape that directs or moves the concrete cuttings into the chute 57. The concrete cuttings may be pushed through the interior by the forward movement of the cutting unit 152 through the concrete slab 20, for example. Once in the chute, the conveyer 58 having the plurality of fins 60 directs the concrete material out and away from the channel 26 being cut in the concrete slab 20, as described regarding FIGS. 1-7.

As the channel 26 is being cut, outward facing surfaces of the first and second vertically oriented blades 160 and 162 and the horizontally oriented static cutting blade 164 may act as floats, smoothing the side walls 97 and the bottom 99 of the channel 26 as well as acting as temporary forms that help the channel 26 form into and retain the desired shape. This means the cutting unit 152 leaves a relatively clean channel 26 that requires less material cleanup or finishing work after the cut is completed relative to other channel forming methods.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

A numbered listing of some implementations includes the following:

Implementation 1. A system for forming a channel in an uncured concrete slab, comprising: a first rotatable blade and a second rotatable blade, the first and second rotatable blades spaced a predetermined distance apart and oriented vertically relative to the uncured concrete slab; a third blade positioned between the first rotatable blade and the second rotatable blade and oriented horizontally relative to the uncured concrete slab, wherein the first rotatable blade, the second rotatable blade, and the third blade cooperate to form a concrete-receiving interior, such that when the system is translated across the uncured concrete slab and the first and second rotatable blades are rotated, a channel is cut into the uncured concrete slab and concrete cuttings move through the concrete-receiving interior; a chute positioned to receive the concrete cuttings from the concrete-receiving interior; and a conveyer having one or more fins extending therefrom, the conveyor and the one or more fins arranged to move the concrete cuttings through the chute away from the channel.

Implementation 2. The system for forming a channel in an uncured concrete slab of Implementation 1, wherein the third blade is rotatable.

Implementation 3. The system for forming a channel in an uncured concrete slab of Implementation 2, wherein the third blade is provided with one or more scrapers attached to an upper surface of the third blade, the one or more scrapers of the third blade configured to direct the concrete cuttings into the chute when the third blade is rotated.

Implementation 4. The system for forming a channel in an uncured concrete slab of Implementation 2, further comprising a motor operably attached to the third blade and configured to rotate the third blade.

Implementation 5. The system for forming a channel in an uncured concrete slab of Implementation 1, wherein the first rotatable blade, the second rotatable blade, and the third blade are arranged to form a u-shape.

Implementation 6. The system for forming a channel in an uncured concrete slab of Implementation 1, wherein the third blade is non-rotatably positioned between the first rotatable blade and the second rotatable blade.

Implementation 7. The system for forming a channel in an uncured concrete slab of Implementation 1, wherein the uncured concrete slab is a hollow core uncured concrete slab having one or more hollow cores.

Implementation 8. The system for forming a channel in an uncured concrete slab of Implementation 7, wherein the channel has a depth equal to a lowest portion of the hollow cores of the uncured concrete slab.

Implementation 9. A method for forming a channel in an uncured concrete slab, comprising: positioning a cutting unit proximate to the uncured concrete slab, the cutting unit comprising: a first rotatable blade and a second rotatable blade, the first and second rotatable blades spaced a predetermined distance apart and oriented vertically relative to the uncured concrete slab; a third blade positioned between the first rotatable blade and the second rotatable blade and oriented horizontally relative to the uncured concrete slab, wherein the first rotatable blade, the second rotatable blade, and the third blade cooperate to form a concrete-receiving interior, a chute positioned proximate to the concrete-receiving interior; and a conveyer having one or more fins extending therefrom; and translating the cutting unit across the uncured concrete slab while rotating the first rotatable blade and the second rotatable blade, such that a channel is cut into the uncured concrete slab and concrete cuttings move through the concrete-receiving interior into the chute, and the one or more fins of the conveyor move the concrete cuttings through the chute away from the channel.

Implementation 10. The method for forming a channel in an uncured concrete slab of Implementation 9, wherein the third blade is rotated.

Implementation 11. The method for forming a channel in an uncured concrete slab of Implementation 10, wherein the third blade is provided with one or more scrapers attached to an upper surface of the third blade, the one or more scrapers of the third blade configured to direct the concrete cuttings into the chute when the third blade is rotated.

Implementation 12. The method for forming a channel in an uncured concrete slab of Implementation 10, further comprising a motor operably attached to the third blade and configured to rotate the third blade.

Implementation 13. The method for forming a channel in an uncured concrete slab of Implementation 9, wherein the first rotatable blade, the second rotatable blade, and the third blade are arranged to form a u-shape.

Implementation 14. The method for forming a channel in an uncured concrete slab of Implementation 9, wherein the third blade is non-rotatably positioned between the first rotatable blade and the second rotatable blade.

Implementation 15. The method for forming a channel in an uncured concrete slab of Implementation 9, wherein the uncured concrete slab is a hollow core uncured concrete slab having one or more hollow cores.

Implementation 16. The method for forming a channel in an uncured concrete slab of Implementation 15, wherein the channel has a depth equal to a lowest portion of the hollow cores of the uncured concrete slab.

Implementation 17. A system, comprising: an uncured concrete slab; a rail system positioned adjacent to the uncured concrete slab; and a channel cutting system supported by the rail system, the channel cutting system comprising: a frame engaging the rail system; and a cutting unit supported by the frame, the cutting unit having at least one blade configured to cut a channel in the uncured concrete slab.

Implementation 18. The system of Implementation 17, wherein the uncured concrete slab is a hollow core concrete slab.

Implementation 19. The system of Implementation 17, wherein the cutting unit comprises: a first rotatable blade and a second rotatable blade, the first and second rotatable blades spaced a predetermined distance apart and oriented vertically relative to the uncured concrete slab; a third blade positioned between the first rotatable blade and the second rotatable blade and oriented horizontally relative to the uncured concrete slab, wherein the first rotatable blade, the second rotatable blade, and the third blade cooperate to form a concrete-receiving interior, such that when the system is translated across the uncured concrete slab and the first and second rotatable blades are rotated, a channel is cut into the uncured concrete slab and concrete cuttings move through the concrete-receiving interior; a chute positioned to receive the concrete cuttings from the concrete-receiving interior; and a conveyer having one or more fins extending therefrom, the conveyor and the one or more fins arranged to move the concrete cuttings through the chute away from the channel.

Implementation 20. The system for forming a channel in an uncured concrete slab of Implementation 19, wherein the third blade is rotatable.

What is claimed is:

1. A system for forming a channel in an uncured concrete slab, comprising:

a first rotatable blade and a second rotatable blade, the first and second rotatable blades spaced a predetermined distance apart and oriented vertically relative to the uncured concrete slab;

a third blade positioned between the first rotatable blade and the second rotatable blade and oriented horizontally relative to the uncured concrete slab, wherein the first rotatable blade, the second rotatable blade, and the third blade cooperate to form a concrete-receiving interior, such that when the system is translated across the uncured concrete slab and the first and second rotatable blades are rotated, a channel is cut into the uncured concrete slab and concrete cuttings move through the concrete-receiving interior;

a chute positioned to receive the concrete cuttings from the concrete-receiving interior; and a conveyer having one or more fins extending therefrom, the conveyer and the one or more fins arranged to move the concrete cuttings through the chute away from the channel.

2. The system for forming a channel in an uncured concrete slab of claim 1, wherein the third blade is rotatable.

3. The system for forming a channel in an uncured concrete slab of claim 2, wherein the third blade is provided with one or more scrapers attached to an upper surface of the third blade, the one or more scrapers of the third blade configured to direct the concrete cuttings into the chute when the third blade is rotated.

4. The system for forming a channel in an uncured concrete slab of claim 2, further comprising a motor operably attached to the third blade and configured to rotate the third blade.

5. The system for forming a channel in an uncured concrete slab of claim 1, wherein the first rotatable blade, the second rotatable blade, and the third blade are arranged to form a u-shape.

6. The system for forming a channel in an uncured concrete slab of claim 1, wherein the third blade is non-rotatably positioned between the first rotatable blade and the second rotatable blade.

7. The system for forming a channel in an uncured concrete slab of claim 1, wherein the uncured concrete slab is a hollow core uncured concrete slab having one or more hollow cores.

8. The system for forming a channel in an uncured concrete slab of claim 7, wherein the channel has a depth equal to a lowest portion of the hollow cores of the uncured concrete slab.

9. A method for forming a channel in an uncured concrete slab, comprising:

positioning a cutting unit proximate to the uncured concrete slab, the cutting unit comprising:

a first rotatable blade and a second rotatable blade, the first and second rotatable blades spaced a predetermined distance apart and oriented vertically relative to the uncured concrete slab;

a third blade positioned between the first rotatable blade and the second rotatable blade and oriented horizontally relative to the uncured concrete slab, wherein the first rotatable blade, the second rotatable blade, and the third blade cooperate to form a concrete-receiving interior, a chute positioned proximate to the concrete-receiving interior; and a conveyer having one or more fins extending therefrom; and translating the cutting unit across the uncured concrete slab while rotating the first rotatable blade and the second rotatable blade, such that a channel is cut into the uncured concrete slab and concrete cuttings move through the concrete-receiving interior into the chute, and the one or more fins of the conveyer move the concrete cuttings through the chute away from the channel.

10. The method for forming a channel in an uncured concrete slab of claim 9, wherein the third blade is rotated.

11. The method for forming a channel in an uncured concrete slab of claim 10, wherein the third blade is provided with one or more scrapers attached to an upper surface of the third blade, the one or more scrapers of the third blade configured to direct the concrete cuttings into the chute when the third blade is rotated.

12. The method for forming a channel in an uncured concrete slab of claim 10, further comprising a motor operably attached to the third blade and configured to rotate the third blade.

13. The method for forming a channel in an uncured concrete slab of claim 9, wherein the first rotatable blade, the second rotatable blade, and the third blade are arranged to form a u-shape.

14. The method for forming a channel in an uncured concrete slab of claim 9, wherein the third blade is non-rotatably positioned between the first rotatable blade and the second rotatable blade.

15. The method for forming a channel in an uncured concrete slab of claim 9, wherein the uncured concrete slab is a hollow core uncured concrete slab having one or more hollow cores.

16. The method for forming a channel in an uncured concrete slab of claim 15, wherein the channel has a depth equal to a lowest portion of the hollow cores of the uncured concrete slab.

17. A system, comprising:

an uncured concrete slab;

a rail system positioned adjacent to the uncured concrete slab; and a channel cutting system supported by the rail system, the channel cutting system comprising:

a frame engaging the rail system; and a cutting unit supported by the frame, the cutting unit comprising:

a first rotatable blade and a second rotatable blade, the first and second rotatable blades spaced a predetermined distance apart and oriented vertically relative to the uncured concrete slab; and a third blade positioned between the first rotatable blade and the second rotatable blade and oriented horizontally relative to the uncured concrete slab, wherein the first rotatable blade, the second rotatable blade, and the third blade cooperate to form a concrete-receiving interior, such that when the system is translated across the uncured concrete slab and the first and second rotatable blades are rotated, a channel is cut into the uncured concrete slab and concrete cuttings move through the concrete-receiving interior.

18. The system of claim 17, wherein the uncured concrete slab is a hollow core concrete slab.

19. The system of claim 17, wherein the cutting unit further comprises:

a chute positioned to receive the concrete cuttings from the concrete-receiving interior; and a conveyer having one or more fins extending therefrom, the conveyer and the one or more fins arranged to move the concrete cuttings through the chute away from the channel.

20. The system for forming a channel in an uncured concrete slab of claim 17, wherein the third blade is rotatable.

* * * * *